(12) United States Patent  
Kaikumaa

(10) Patent No.: US 7,801,427 B2
(45) Date of Patent: Sep. 21, 2010

(54) ADJUSTMENT OF SHOOTING PARAMETERS IN DEPENDENCE OF MOTION IN A SCENE

(75) Inventor: Timo Kaikumaa, Tampere (FI)

(73) Assignee: Nokia Corporation, Espoo (FI)

(*) Notice: Subject to any disclaimer, the term of this patent is extended or adjusted under 35 U.S.C. 154(b) by 830 days.

(21) Appl. No.: 11/224,584

(22) Filed: Sep. 12, 2005

(65) Prior Publication Data

US 2007/0058965 A1    Mar. 15, 2007

(51) Int. Cl.
G03B 17/00 (2006.01)
H04N 5/228 (2006.01)

(52) U.S. Cl. ................ 396/52; 396/55; 348/208.1; 348/208.6; 348/208.12

(58) Field of Classification Search ......... 396/213–262, 396/52–55, 65, 67, 153; 348/154, 155, 208.12–208.16, 348/362–368, 699, 208.3, 223.1–224.1, 655, 348/657, 208.99, 208.1, 208.2, 208.4, 208.5, 348/208.6, 208.11; 250/559.32, 206.1
See application file for complete search history.

(56) References Cited

U.S. PATENT DOCUMENTS

| 4,220,967 | A | * | 9/1980 | Ichida et al. ............... 348/699 |
|---|---|---|---|---|
| 4,531,157 | A | * | 7/1985 | Ishikawa .................... 348/352 |
| 4,638,366 | A | * | 1/1987 | Yoshimura et al. .......... 348/364 |
| 4,825,291 | A | * | 4/1989 | Mimura et al. ........... 348/220.1 |
| 5,237,405 | A | * | 8/1993 | Egusa et al. ............. 348/208.1 |
| 6,614,996 | B2 | * | 9/2003 | Okisu et al. .................... 396/63 |
| 6,693,673 | B1 | * | 2/2004 | Tanaka et al. ............... 348/371 |
| 2002/0145667 | A1 | * | 10/2002 | Horiuchi ................ 348/207.99 |
| 2006/0007348 | A1 | * | 1/2006 | Choi ........................ 348/363 |
| 2006/0017814 | A1 | * | 1/2006 | Pinto et al. ............... 348/208.4 |
| 2006/0098729 | A1 | * | 5/2006 | Shen ..................... 375/240.01 |

FOREIGN PATENT DOCUMENTS

| EP | 1 662 806 A1 | 5/2006 |
|---|---|---|
| JP | 08-251473 A | 9/1996 |
| JP | 09-074516 A | 3/1997 |
| JP | 2001-511961 A | 8/2001 |
| JP | 2005-102116 A | 4/2005 |
| WO | WO-98/34400 A1 | 8/1998 |

* cited by examiner

Primary Examiner—Rochelle-Ann J Blackman
(74) Attorney, Agent, or Firm—Harrington & Smith

(57) ABSTRACT

According to one aspect of the present invention, there is provided a camera system including a motion estimator estimating a motion of an image taken by the camera system, and; a controller controlling, based on the estimation, an update frequency of a predetermined parameter and/or an amount of adjustment of the predetermined parameter per update cycle.

8 Claims, 5 Drawing Sheets

ADJUSTMENT OF SHOOTING PARAMETERS IN DEPENDENCE OF MOTION IN A SCENE

FIELD OF THE INVENTION

This invention relates to camera systems or image processing systems.

BACKGROUND OF THE INVENTION

Camera devices are controlling various parameters relating to their behavior during their operation. For example, during video recording or previewing for taking a still picture, the camera devices continuously measure brightness or color balance of the taken images and adjust the exposure time or white balance.

It is beneficial if such a control mechanism can react quickly on changing conditions. For example when a user moves the camera from a bright window view to a much darker indoor view, the exposure time should be made longer in order to ensure that some amount of details can still be captured.

On the other hand, there are cases where the quick adjustment makes the user uncomfortable. For example when recording a video clip, parameters like exposure time of successive image frames should not vary too much. Otherwise the brightness of images may change back and forth between lighter and darker in a short period. The result may be that the recorded video clip appears to comprise a plurality of different video clips made under different lighting conditions. In circumstances where e.g. sudden glimpses of sunlight are included in the view of steadily hold camera, too hasty changes in brightness parameter may further result in pumping effect, that is, brightness continuously changes between darker and lighter in clearly noticeable steps and never settling down.

SUMMARY OF THE INVENTION

On this background, the present invention intends to provide an intelligent control architecture which can understand well when it is preferable to react quickly to changes in conditions and when it is better to react more slowly.

According to one aspect of the present invention, there is provided a camera system comprising: a motion estimator estimating a motion of an image taken by the camera system, and; a controller controlling, based on the estimation, an update frequency of a predetermined parameter and/or an amount of adjustment of the predetermined parameter per update cycle.

Accordingly, the update frequency (or rate) and/or the amount of adjustment can be changed by the motion of the scene to be taken. Therefore the adjustment rate and/or amount of adjustment can be optimized for various situations. The user can obtain an appropriate control effect on photography or video which suits for the motion of scene to be taken. Said parameter can be related with one or more of an amount of exposure, an amount of amplifying, white balance, or any other operations of the camera system.

In one preferred embodiment, said motion estimator is arranged to divide a shooting area logically into sections and to estimate a motion of an image in each of the sections, and; said controller is arranged to perform said controlling by taking into account results of said estimations of 2 or more of said sections.

In this embodiment, said camera system can perform the controlling by taking into account a structure of motions in a scene to be taken. Therefore further appropriate and intelligent control can be realized.

The motion estimation can be performed from several successive image frames. However, in one embodiment, said camera system may utilize a motion sensor. With this mind, according to another aspect of the present invention, there is provided a camera system comprising a motion sensor for detecting a motion of the camera system and a controller controlling a frequency of adjusting a predetermined parameter and/or an amount of adjustment of the predetermined parameter per update cycle by taking into account an output signal of the motion sensor.

According to further aspect of the present invention, there is provided an electronic circuit for controlling a camera module taking a image data electronically and for processing an output signal of the camera module, the electronic circuit being arranged: to estimate a motion of an image taken by the camera module, and; to change, based on a estimated motion, one or more of a frequency of adjusting a control parameter used for controlling the camera module, an amount of adjustment of the control parameter per update cycle, a frequency of adjusting a processing parameter used for processing the output signal, and an amount of adjustment of the processing parameter per update cycle.

According to still further aspect of the present invention, there is provided an image processing unit for controlling a camera module taking a image data electronically and for processing an output signal of the camera module, the image processing unit comprising a processor and a program, and the program being arranged to instruct the processor: to estimate a motion of an image taken by the camera module, and; to change, based on a estimated motion, one or more of a rate of adjusting a control parameter used for controlling the camera module, an amount of adjustment of the control parameter per update cycle, a rate of adjusting a processing parameter used for processing the output signal, and an amount of adjustment of the processing parameter per update cycle.

The control parameter may be related with an exposure time, an amount of diaphragming if the camera module comprises a diaphragm, an amount of amplifying a signal from an image sensor, or other operations of the camera module. The processing parameter may be related with a white balance.

Above-disclosed electronic circuits can be produced as a semiconductor chip and can be sold in the market. Also above-disclosed electronic circuits can be implemented in a camera device, e.g. a handportable digital camera or a handportable cellular phone having a camera.

The present invention includes any combinations of matters described in this specification. Further features or advantages will be described herein below by using an exemplary figures and embodiments.

BRIEF DESCRIPTION OF THE DRAWINGS

Embodiments of the present invention will now be described by way of example only and with reference to accompanying drawings in which.

DETAILED DESCRIPTION OF THE PREFERRED EMBODIMENTS

Figure 1:
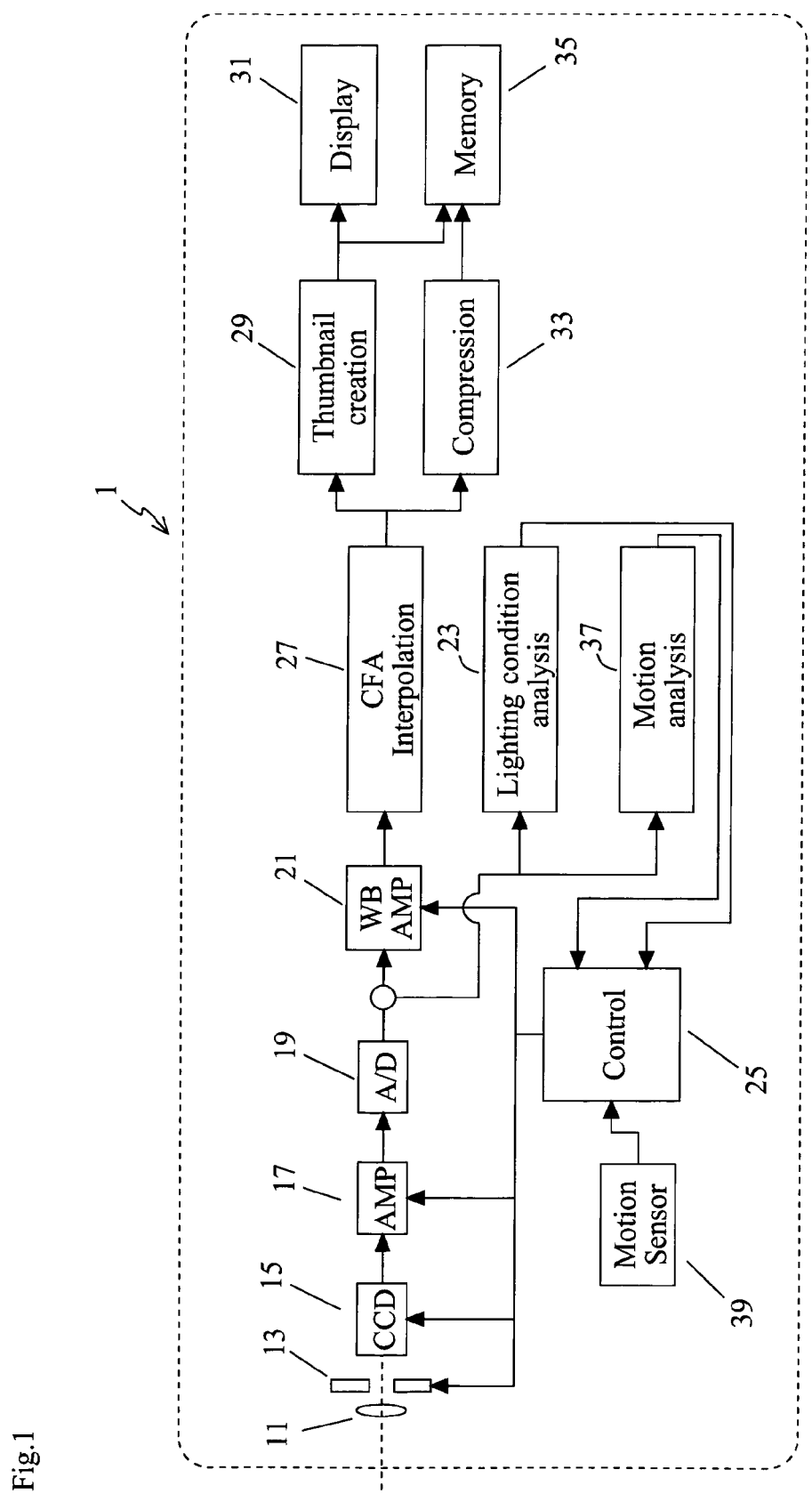
FIG. 1 is a schematic diagram of a camera system 1 according to a preferred embodiment of the present invention.

FIG. 1 is a schematic diagram of a camera system 1 according to a preferred embodiment of the present invention. The camera system comprises a lens 11, a diaphragm 13, a CCD or CMOS sensor 15, an analog amplifier 17, an A/D converter 19, a white balance amplifier 21, a lighting condition analyzer 23, a controller 25, a CFA interpolator 27, a thumbnail creator 29, a display 31, data compressor 33, a memory 35. The lens 11 concentrates and focuses incident light on the CCD sensor 15. The sensor 15 converts the incident light to an electric signal. The sensor 15 also comprises an electric shutter, and data taking (shooting) will be performed only the electric shutter is opened. The shutter speed is variable and controlled by the controller 25. The analog amplifier 17 amplifies the output signal of the CCD sensor 15. The magnitude (amount) of amplifying is variable, and controlled by the controller 25. A/D converter 19 converts the amplified signal to a digital-format data. This digital data may be called as a raw data, and have a RGB or CMY Bayer format, which will be used for constructing a photographic or a video data.

The white balance amplifier 21 adjusts a white balance of the raw data, i.e. digitally amplifying or discriminating one or more of color components of the raw data so that the raw data can express a white object as white. The amount of adjustment is directly controlled by the controller 25 based on an analysis of the lighting condition analyzer 23. The lighting condition analyzer 23 estimates a lighting condition of a view taken by the sensor 15 from the raw data which is not white-balanced. The lighting condition analyzer 23 also measures brightness (or intensity) of the raw data which is not white-balanced. Based on the brightness measurement, the controller changes one or more of an amount of diaphragming of the diaphragm 13, a shutter speed of the sensor 15, and a magnitude (amount) of amplifying by the amplifier 17.

The CFA interpolator 27 constructs a photographic image data from the white-balanced raw data by applying a CFA (Color Filter Array) interpolation. This image data can be directly replayed by many of existing digital systems, i.e. personal computers, mobile phones or digital cameras. In an embodiment, the video recording, the CFA interpolator 27 may not be needed, especially when the sensor comprises the same number of pixels for each color components. Also the CFA interpolator 27 may not be used for video recordings, so as to increase the processing speed.

The thumbnail creator 29 creates a thumbnail image from the image data constructed by the CFA interpolator 27. The thumbnail images will be displayed on the display 31, for the purpose of previewing or confirming the taken still/video images. The data compressor 33 compresses the image data, i.e. by JPEG, JPEG2000, Motion JPEG, or MPEG. The compressed data is stored in the memory 35. It is preferable that the compressed image data is stored together with its thumbnail image.

The camera system 1 also comprises a motion analyzer 37. The motion analyzer analyzes the raw data to estimate a motion of the image taken by the CCD sensor. The camera system 1 can use any of existing method for motion estimation as long as requirements (i.e. size, price, speed, power consumption) are satisfied. In this embodiment the motion estimation is carried out by comparing successive image frames. A frame means a total area of a still picture or a single picture in a series of video data. The motion analyzer 37 divides a frame logically into a plurality of sections (smaller areas), and performs the motion estimation for each of the sections. This smaller area (section) is called a macroblock. The motion analyzer 37 can estimate the amount (speed) of the motion. It is possible to arrange the motion analyzer 37 to estimate the direction of the motion too.

FIG. 2 schematically illustrates that a frame is divided into macroblocks (sections) and the motions are estimated for each macroblocks. A frame 50 schematically represents a total area of a still picture or a single picture in a series of video data. The motion analyzer 37 divides the frame 50 logically into 4 macroblocks—A, B, C, and D, and estimates the motions for each macroblocks (FIG. 2a). In one case, it may be estimated that all macroblocks have almost same amount of motion, as illustrated in FIG. 2b. This case would happen when a user is moving the camera system 1. In the other cases, it may be estimated that the Macroblock D is moving a lot, however, macroblock A, B, C are not moving (FIG. 2c) or are moving but only a little (FIG. 2d). Those cases may happen when the frame 50 contains a moving object, i.e. a car, a train, a running man, . . . , on a stable background.

Please note that the FIG. 2a-d is just a schematic example. For the real products the number of macroblocks may be an order of ten or hundred.

Figure 2B:
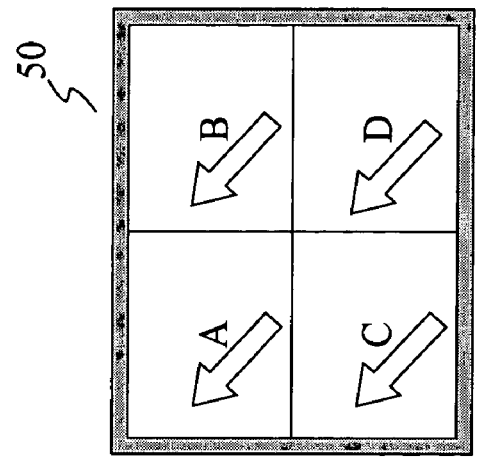
FIG. 2 is a schematic illustration that a frame is divided into macroblocks
Figure 2D:
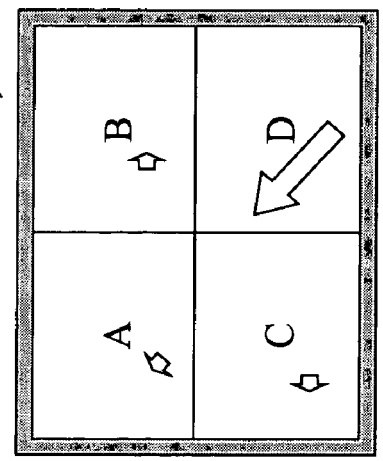
Figure 2A:
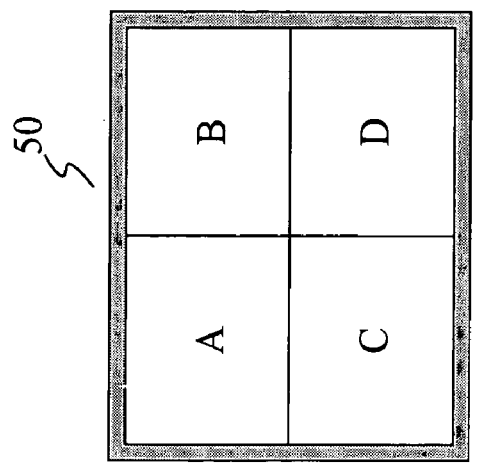

When the estimated motion speeds are small or zero for all macroblocks, as like the example of FIG. 2a, then the controller 25 changes one or more control parameters to reduce one or more of a rate of adjusting the diaphragm 13, the shutter speed of the CCD or CMOS sensor 15, the magnitude of amplifying of the amplifier 17, and white balance in the white balance amplifier 21. This is because the lighting condition may not be changed dramatically; those adjustments need not to be performed so frequently. Then the user does not need be annoyed by a quick change of colors of the images caused by the quick change of the control parameters, which are presented in the display 31 or stored in the memory 35. Also this feature may be able to save a power consumption used for said adjustments.

The control parameter(s) may be parameter(s) for controlling one or more of adjustable amounts at one time for the diaphragm 13, the shutter speed of the CCD sensor 15, the magnitude of amplifying of the amplifier 17, and white balance in the white balance amplifier 21. By reducing such adjustable amounts the quick change of colors or images may also be avoided.

When the estimated motion speeds are large for all macroblocks, as like the case illustrated in FIG. 2b, then the controller 25 changes one or more said control parameters to increase the rate of adjusting one or more of the diaphragm 13, the shutter speed of the CCD sensor 15, the amplifier 17, and the white balance amplifier 21. In such case, the user may be taking a picture or video with moving the camera system 1, so the lighting condition can be changed largely, i.e. from indoor to outdoor. By increasing the adjustment rate the camera system 1 can provide a user with images taken with the appropriate exposure, amplification and/or white balancing even for the case that the scene to be taken is changing quickly.

Figure 2C:
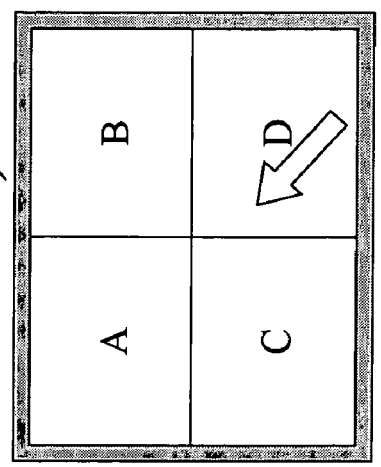

In case the motion analyzer 37 estimates that the large motions exist only in a part of the frame, as illustrated in FIG. 2c or FIG. 2d, the controller 25 does not increase the adjustment rate at all, or does not increase so much compared with the case of FIG. 2b. This is because, in such cases the scene to be taken may contain a moving object only in a part of the frame, and remaining parts may be stable. And the lighting condition may not change dramatically for such scenes. So the system may not need to adjust the exposure, brightness or white balance so frequently.

The camera system 1 can comprise a motion sensor 39 for detecting a motion of the camera system 1 itself, and the controller 25 can be arranged to perform the controlling with taking account of the signal of the motion sensor.

Figure 3:
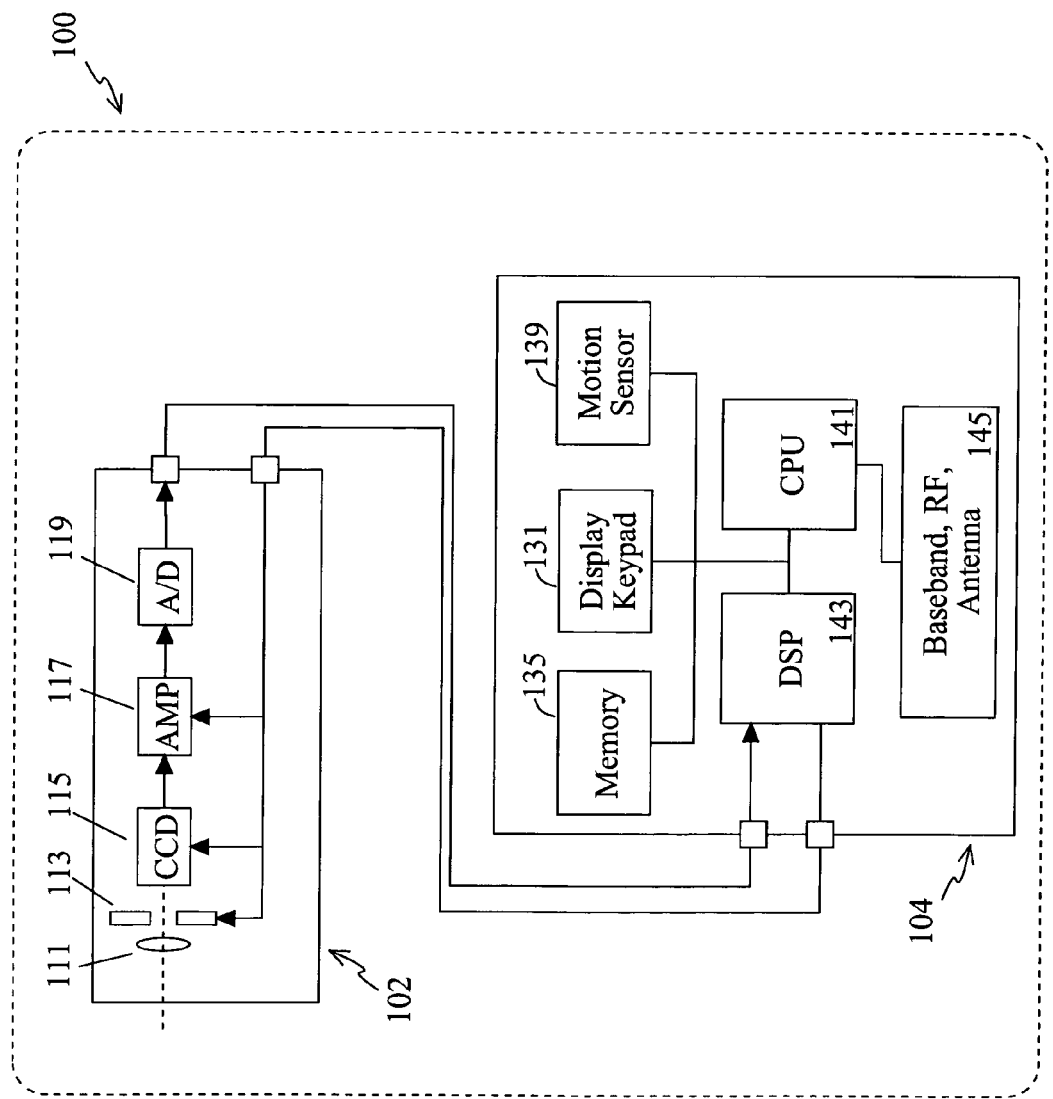
FIG. 3 illustrates an embodiment of the camera system 1.

FIG. 3 illustrates an example embodiment of the camera system 1. In this embodiment, the camera system 1 can be an imaging phone, that is, a handportable cellular phone comprising a camera and being able to take still pictures and videos. The imaging phone 100 comprises a camera module 102 and a phone module 104, and those modules are house in a common housing. The camera module 102 comprises a lens 111, a diaphragm 113, a CCD or CMOS sensor 115, an analog amplifier 117, an A/D converter 119. These units correspond to the lens 11, the diaphragm 13, the CCD sensor 15, the analog amplifier 17, the A/D converter 19 of the camera system 1 respectively, and contain the same functionality with them.

The phone module 104 comprises a user interface 131 containing a display and a keypad, a memory 135, a motion sensor 139, CPU 141, DSP 143, and communication section 145 containing baseband processing, RF processing and antennas. The display of the UI 131, the memory 135 and the motion sensor 139 correspond to the display 11, the memory 35, the motion sensor 39 and contain the same functionality with them.

The memory stores a program for the CPU 141. The CPU 141 controls the whole of the phone module 104 in accordance with the instructions of the program. The memory stores another program which is used for the DSP 143. This program instructs the DSP 143 to perform the functionalities of the white balance amplifier 21, the lighting condition analyzer 23, the controller 25, the CFA interpolator 27, the thumbnail creator 29, the compressor 33, and the motion analyzer 37.

Figure 5:
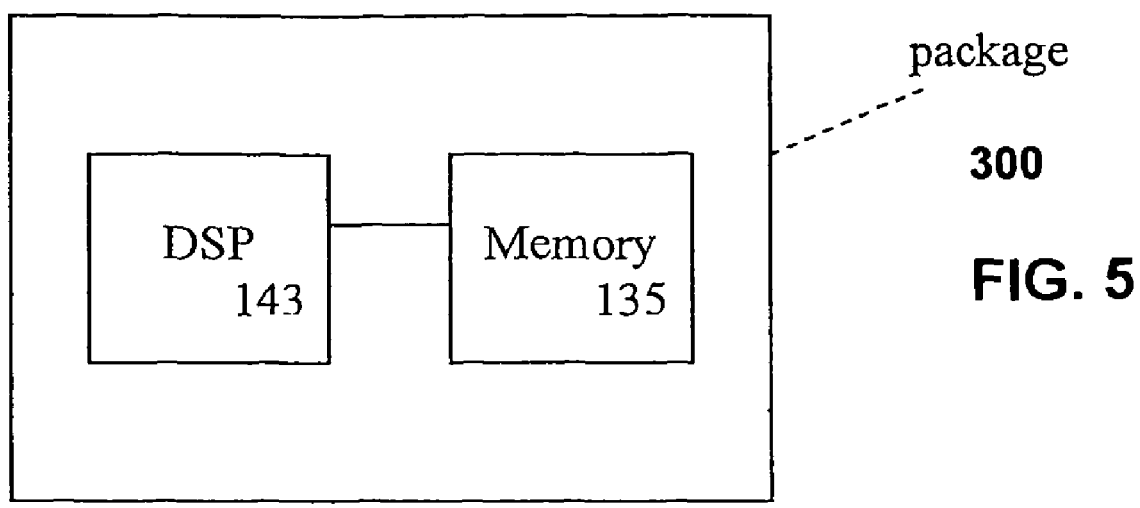
FIG. 5 illustrates a circuit package containing a DSP and a memory.

Referring to FIG. 5, the DSP 143 can be sold independently as a package 300 containing the DSP 143, a memory and said program for the DSP 143.

Figure 4:
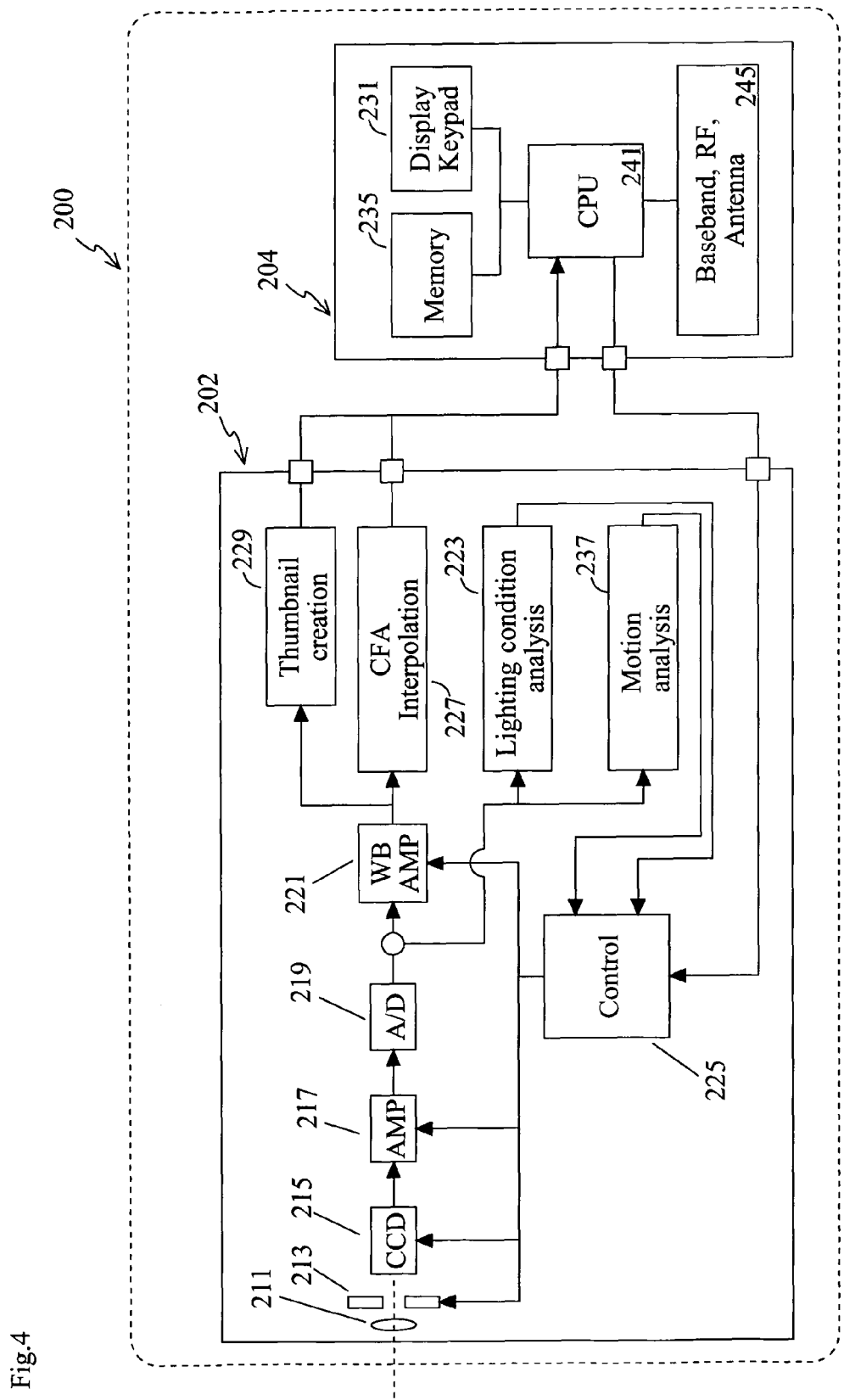
FIG. 4 illustrates another embodiment of the camera system 1.

FIG. 4 illustrates another example embodiment of the camera system 1. In this embodiment, the camera system 1 is also implemented as an imaging phone. As the imaging phone 100 of the previous example, the imaging phone 200 also comprises a camera module 202 and a phone module 204. However, the camera module 202 has more functions than the camera module 101.

The camera module 202 comprises a lens 211, a diaphragm 213, a CCD and/or CMOS sensor 215, an analog amplifier 217, an A/D converter 219, a white balance amplifier 221, a lighting condition analyzer 223, a controller 225, a CFA interpolator 227, a thumbnail creator 229, and a motion analyzer 237. These units correspond to the lens 11, the diaphragm 13, the sensor 15, the analog amplifier 17, the A/D converter 19, the white balance amplifier 21, the lighting condition analyzer 23, the controller 25, the CFA interpolator 27, the thumbnail creator 29, and the motion analyzer 37 of the camera system 1 respectively, and contain the same functionality with them. However, in contrast with the embodiment explained with FIG. 3, the white balance amplifier 221, the lighting condition analyzer 223, the controller 225, the CFA interpolator 227, the thumbnail creator 229, and the motion analyzer 237 are implemented by hardware circuits. That is, those functionalities do not use software processing, or use very little software processing compared with the embodiment using a CPU or a DSP for realizing those functionalities. The hardware circuit containing one or more of the white balance amplifier 221, the lighting condition analyzer 223, the controller 225, the CFA interpolator 227, the thumbnail creator 229, and the motion analyzer 237 can be integrated in a chip, and sold as an independent product.

The phone module 204 comprises a user interface 231, a memory 235, CPU 241, a communication section 245. Those units correspond to the user interface 131, the memory 135, the CPU 141, and the communication section 145, and have the same functionalities with them. The CPU 241 controls the whole of the phone module 204 in accordance with the instructions of the program. The CPU 241 can also changes the behavior of the controlling function of the controller 225 in accordance with the instructions of the program stored the memory 235 or with the instructions of the user inputted through the user interface 231.

Please note that various modifications may be made without departing from the scope of the present invention. For example, what the controller 25 controls are not limited to described examples, but can be many other things, e.g. a shutter speed of a mechanical shutter if the camera system 1 comprises a mechanical shutter.

Whilst endeavoring in the foregoing specification to draw attention to those features of the invention believed to be of particular importance, it should be understood that the applicant claims protection in respect of any patentable feature of combination of features hereinbefore referred to and/or shown in the drawings whether of not particular emphasis has been placed thereon.

The invention claimed is:

1. A camera apparatus comprising:
a camera module and a phone module;
said camera module comprises an image sensor, an amplifier configured to amplify an output signal of the image sensor, and an A/D converter configured to convert the amplified signal to digital signal,
said phone module comprises a baseband circuit and a controller configured to control the baseband circuit,
wherein said controller is connected to the camera module by a first line configured to receive an output signal of the camera module, and by a second line which is associated with at least one of the image sensor and the amplifier, and said controller is configured to process an output signal of the camera module, and said controller is further configured:
to estimate a motion of an image taken by the camera module, and
to adjust at least one value depending on whether motion is estimated to exist in a portion of a frame or whether motion is estimated to exist in an entire frame, said at least one value comprising at least one of:
an update rate of a control parameter configured to control the camera module,
an amount of adjustment of the control parameter per update cycle in a given update cycle,
an update rate of a processing parameter configured to process the output signal of the camera module, and
an amount of adjustment of the processing parameter per update cycle in the given update cycle,
where the adjusted at least one value is applied to the entire frame.

2. A camera apparatus according to claim 1, where said at least one value comprises at least one of:
an update rate of a white balance adjustment of the output signal of the camera module, and
an amount of white balance adjustment per update cycle in the given update cycle.

3. A camera apparatus according to claim 2, where said controller comprises a first processor configured to control the baseband circuit, a second processor configured to control an output signal of the camera module and configured to control the camera module, and a memory configured to store programs for instructing to the first and the second processors.

4. A camera apparatus according to claim 3, where said phone module comprises a motion sensor whose output signal is used by said controller, where the controller is configured to adjust said at least one value depending the output signal of the motion sensor.

5. A camera apparatus comprising:
a camera module and a phone module;
said camera module comprises an image sensor, a first controller, an image constructor configured to construct an image data from a raw data of the image sensor, and a motion analyzer configured to estimate a motion of an image taken by the image sensor;
said phone module comprises a baseband circuit and a second controller configured to control the baseband circuit, and is connected to the camera module by a first line configured to receive an output data of the image constructor, and by a second line which is associated with the first and the second controller;
said motion analyzer is configured to estimate whether motion exists in a portion of a frame or whether motion exists in an entire frame,
said first controller is configured:
to adjust at least one value depending on an estimation made by the motion analyzer, said at least one value comprising at least one of:
an update rate of a control parameter configured to control the camera module,
an amount of adjustment of the control parameter per update cycle in a given update cycle,
an update rate of a processing parameter configured to process the raw data, and
an amount of adjustment of the processing parameter per update cycle in the given update cycle,
where the adjusted at least one value is applied to the entire frame,
where said first controller is further configured to be controlled by the second controller.

6. A camera apparatus according to claim 5, where said at least one value comprises at least one of:
an update rate of a white balance adjustment of the raw data, and
an amount of white balance adjustment per update cycle in the given update cycle.

7. A method comprising:
estimating, with a motion sensor, a motion of an image taken by a camera apparatus, the camera apparatus comprising a camera module and a phone module, said camera module comprising an image sensor, a first controller, an image constructor configured to construct an image data from a raw data of the image sensor, and a motion analyzer configured to estimate a motion of an image taken by the image sensor; said phone module comprising a baseband circuit and a second controller configured to control the baseband circuit, and is connected to the camera module by a first line configured to receive an output data of the image constructor, and by a second line which is associated with the first and the second controller;
estimating, with the motion analyzer, whether motion exists in a portion of a frame or whether motion exists in an entire frame;
adjusting, with the first controller,:
at least one value depending on an estimation made by the motion analyzer, said at least one value comprising at least one of:
an update rate of a control parameter configured to control the camera module,
an amount of adjustment of the control parameter per update cycle in a given update cycle,
an update rate of a processing parameter configured to process the raw data, and
an amount of adjustment of the processing parameter per update cycle in the given update cycle,
applying the adjusted at least one value to the entire frame; and
controlling the first controller by the second controller.

8. A method comprising:
estimating, with a motion sensor, a motion of an image taken by a camera apparatus, the camera apparatus comprising a camera module and a phone module, said camera module comprising an image sensor, a first controller, an image constructor configured to construct an image data from a raw data of the image sensor, and a motion analyzer configured to estimate a motion of an image taken by the image sensor, said phone module comprising a baseband circuit and a second controller configured to control the baseband circuit, and is connected to the camera module by a first line configured to receive an output data of the image constructor, and by a second line which is associated with the first and the second controller;
estimating, with the motion analyzer, whether motion exists in a portion of a frame or whether motion exists in an entire frame;
adjusting, with the first controller:
at least one value depending on an estimation made by the motion analyzer, said at least one value comprising at least one of:
an update rate of a control parameter configured to control the camera module,
an amount of adjustment of the control parameter per update cycle in a given update cycle,
an update rate of a processing parameter configured to process the raw data, and
an amount of adjustment of the processing parameter per update cycle in the given update cycle,
applying the adjusted at least one value to the entire frame; and
controlling the first controller by the second controller.

* * * * *